(12) United States Patent
Chrisp

(10) Patent No.: US 9,689,744 B2
(45) Date of Patent: Jun. 27, 2017

(54) VISIBLE-INFRARED PLANE GRATING IMAGING SPECTROMETER

(71) Applicant: Massachusetts Institute of Technology, Cambridge, MA (US)

(72) Inventor: Michael P. Chrisp, Burlington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 284 days.

(21) Appl. No.: 14/327,704

(22) Filed: Jul. 10, 2014

(65) Prior Publication Data

US 2015/0021480 A1    Jan. 22, 2015

Related U.S. Application Data

(60) Provisional application No. 61/847,238, filed on Jul. 17, 2013.

(51) Int. Cl.
| | |
|---|---|
| *G01J 3/28* | (2006.01) |
| *G01J 3/02* | (2006.01) |
| *G01J 3/18* | (2006.01) |
| *G01J 3/12* | (2006.01) |

(52) U.S. Cl.
CPC ............ *G01J 3/2823* (2013.01); *G01J 3/021* (2013.01); *G01J 3/0205* (2013.01); *G01J 3/0208* (2013.01); *G01J 3/0256* (2013.01); *G01J 3/1804* (2013.01); *G01J 2003/1204* (2013.01); *G01J 2003/1273* (2013.01)

(58) Field of Classification Search
CPC ..................................... G01J 3/2823
See application file for complete search history.

(56) References Cited

U.S. PATENT DOCUMENTS

| | | | | |
|---|---|---|---|---|
| 2,424,283 | A * | 7/1947 | Miles | G02B 23/00 |
| | | | | 359/431 |
| 5,233,405 | A * | 8/1993 | Wildnauer | G01J 3/18 |
| | | | | 356/307 |
| 5,880,834 | A * | 3/1999 | Chrisp | G01J 3/02 |
| | | | | 356/305 |
| 6,480,333 | B1 | 11/2002 | Maker | |
| 7,414,719 | B2 | 8/2008 | Chrisp | |
| 8,203,710 | B1 * | 6/2012 | Mitchell | G01J 3/0208 |
| | | | | 356/328 |
| 2006/0038994 | A1 * | 2/2006 | Chrisp | G01J 3/2823 |
| | | | | 356/328 |
| 2007/0171415 | A1 * | 7/2007 | Chrisp | G01J 3/02 |
| | | | | 356/328 |
| 2012/0002202 | A1 * | 1/2012 | Chrisp | G01J 3/0208 |
| | | | | 356/328 |

* cited by examiner

*Primary Examiner* — David Porta
*Assistant Examiner* — Jeremy S Valentiner
(74) *Attorney, Agent, or Firm* — Sam Pasternack; MIT Technology Licensing Office

(57) ABSTRACT

An imaging spectrometer, covering the visible through infrared wavelengths, which disperses the light by a plane diffraction grating behind a wedged optical element. This design uses an achromatic doublet lens with a reflective coating on its convex back surface to produce the spectra on a flat detector. Spatial keystone distortion and spectral smile are controlled to less than one tenth of a pixel over the full wavelength range, facilitating the use of simple retrieval algorithms.

9 Claims, 4 Drawing Sheets

VISIBLE-INFRARED PLANE GRATING IMAGING SPECTROMETER

This application claims priority to provisional application Ser. No. 61/847,238 filed Jul. 17, 2013, the contents of which are incorporated herein by reference.

This invention was made with government support under Contract Na. FA8721-05-C-0002 awarded by the U.S. Air Force. The government has certain rights in the invention.

BACKGROUND OF THE INVENTION

Field of Endeavor

The present invention relates to an imaging spectrometer, and more to an arrangement of optical elements to provide full spectral imaging over a wide waveband, in this case covering the visible through infrared in a compact instrument.

State of Technology

The challenge in imaging spectrometers is to make them small enough to fit in the small unmanned aerial vehicles which are now available. For remote sensing purposes, these aerial vehicles present a savings in operating costs. Small Imaging spectrometers are also advantageous for man-portable instruments and for fitting into existing industrial production lines. Currently, reflective imaging spectrometers with convex gratings are typically used in the visible-infrared region. Making the convex gratings with low straylight for these visible-infrared spectrometers is difficult and expensive. Reflective imaging spectrometers are also too large for the smaller unmanned aerial vehicles.

U.S. Pat. No. 5,880,834 issued to Michael P. Chrisp Mar. 19, 1999 provides the following state of technology information: "There are three problems in designing an imaging spectrometer where light in a slice of an image field passing through an entrance slit is to be diffracted by a grating parallel to the slit and imaged onto a focal plane for display or recording with good spatial resolution parallel to the slit and good spectral resolution perpendicular to the slit: 1. Eliminating astigmatism over the spectrum on the image plane. 2. Removing field curvature from the spectrum focused onto the image plane. 3. Obtaining good spatial resolution of the entrance slit which involves eliminating astigmatism at different field angles from points on the entrance slit." The disclosure of U.S. Pat. No. 5,880,834 is incorporated herein in its entirety for all purposes.

There are two methods for the making the convex gratings for the above imaging spectrometer, electron beam lithography and single point diamond turning. The gratings are difficult to make because for good diffraction efficiency the blaze angle needs to be constant to the local surface tangent, U.S. Pat. No. 6,480,333 discloses an electron beam fabrication method developed at the California Institute of technology. These gratings are extremely good, but having only one facility in the US has limited their application. Nowadays, most imaging spectrometers with convex gratings have them fabricated by single point diamond turning. Unfortunately these gratings tend to have high scattered light in the visible. Diamond turned mirror surfaces, when used in the visible are typically post polished to reduce the surface roughness, but with a grating surface this is impossible without destroying the grooves, so the intrinsic surface roughness is that generated by the diamond turning process.

A number of catadioptric designs have been developed for the infrared. However, these designs are based on two properties of infrared optical materials, high refractive index and low spectral dispersion, so they are not suitable of the visible-infrared spectral region.

U.S. Pat. No. 7,414,719 for an imaging spectrometer wide field catadioptric design issued to Michael P. Chrisp Aug. 19, 2008 provides the following state of technology information: "The present invention provides a compact imaging spectrometer with an immersive or reflective diffraction grating that compensates optical distortions. The imaging spectrometer comprises an entrance slit for transmitting light, a system with a catadioptric lens and a dioptric lens for receiving the light and directing the light, an immersion grating, and a detector array. The entrance slit, the system for receiving the light, the immersion grating, and the detector array are positioned wherein the entrance slit transmits light to the system for receiving the light and the system for receiving the light directs the light to the immersion grating and the immersion grating receives the light and directs the light through the system for receiving the light to the detector array. The compact imaging spectrometer uses smaller cryogenic coolers facilitating its using in portable (man carried) gas detection systems and in small unmanned aerial vehicles for remote gas detection." The disclosure of U.S. Pat. No. 7,414,719 is incorporated herein in its entirety for all purposes.

SUMMARY OF THE INVENTION

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention is an imaging spectrometer that covers the visible through infrared, dispersing the light with a plane diffraction grating behind a wedged optical element. This compact design uses an achromatic doublet lens with a reflective coating on its convex back surface to produce the spectra on a flat detector. The invention includes an entrance slit for transmitting light, an achromatic lens with a reflective back surface, a plane reflective diffraction grating immersed in a wedged optical element, an order sorting filter, and a visible-infrared detector. The plane grating, which can be replicated, cut, ruled or etched, is easier to fabricate than the convex grating required for comparable imaging spectrometers.

The powers and surface shapes of in the invention are chosen to correct the Petzval curvature, the chromatic aberration, the spatial keystone distortion and the spectral smile. The spatial keystone distortion is controlled to less than one tenth of a pixel over the full wavelength range from the visible through infrared, and the spectral smile is kept to less than one tenth of a pixel over the wavelength range. The low spatial distortion means that the spectral information from a pixel on the ground is dispersed over a single column of pixels, providing simultaneous correlated spectral information without the need to resample.

In another embodiment of the visible-infrared plane grating imaging spectrometer constructed in accordance with the present invention, there is a modification wherein the two lenses of the achromatic doublet are no longer cemented together but have been separated. With no optical cement this embodiment can be used in the mid-wave and long-wave infrared and the ultraviolet region.

In yet another embodiment of the visible-infrared plane grating imaging spectrometer constructed in accordance with the present invention, there is a modification wherein the reflective coating has been removed from the back of the achromatic doublet and its function implemented by a separate concave mirror.

In yet another embodiment of the visible-infrared plane grating imaging spectrometer constructed in accordance with the present invention, there is a modification wherein the plane reflective diffraction grating immersed in the wedged optical element has been replaced by a separate wedged optical element and a separate plane reflective diffraction grating which is no longer immersed.

In yet another embodiment of the visible-infrared plane grating imaging spectrometer constructed in accordance with the present invention, there is a modification wherein the wedged optical element has been removed from the system so the plane reflective diffraction grating operates in air.

In yet another embodiment of the visible-infrared plane grating imaging spectrometer constructed in accordance with the present invention, there is a modification wherein the achromatic lens with a reflective back surface has been replaced by a triplet achromatic or apochromatic lens with a reflective back surface.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWING

The accompanying drawings, which are incorporated into and constitute a part of the specification, illustrate specific embodiments of the invention and, together with the general description of the invention given above, and the detailed description of the specific embodiments, serve to explain the principles of the invention.

DESCRIPTION OF THE PREFERRED EMBODIMENT

This visible-infrared plane grating imaging spectrometer was developed for remote sensing for smaller scale unmanned aerial vehicles. With fewer optical elements to assemble, and an easily fabricated plane grating, it is easier to fabricate and assemble than the reflective optical systems utilizing convex gratings. Use of conventional replicated gratings leads to lower stray light than the diamond turned visible gratings with their high surface roughness grooves. The spatial keystone and spectral smile have been controlled over the full wavelength range, to ensure the purity of the spectral data received from the ground footprints which facilitates the accuracy of the spectral matching algorithms.

Figure 1:
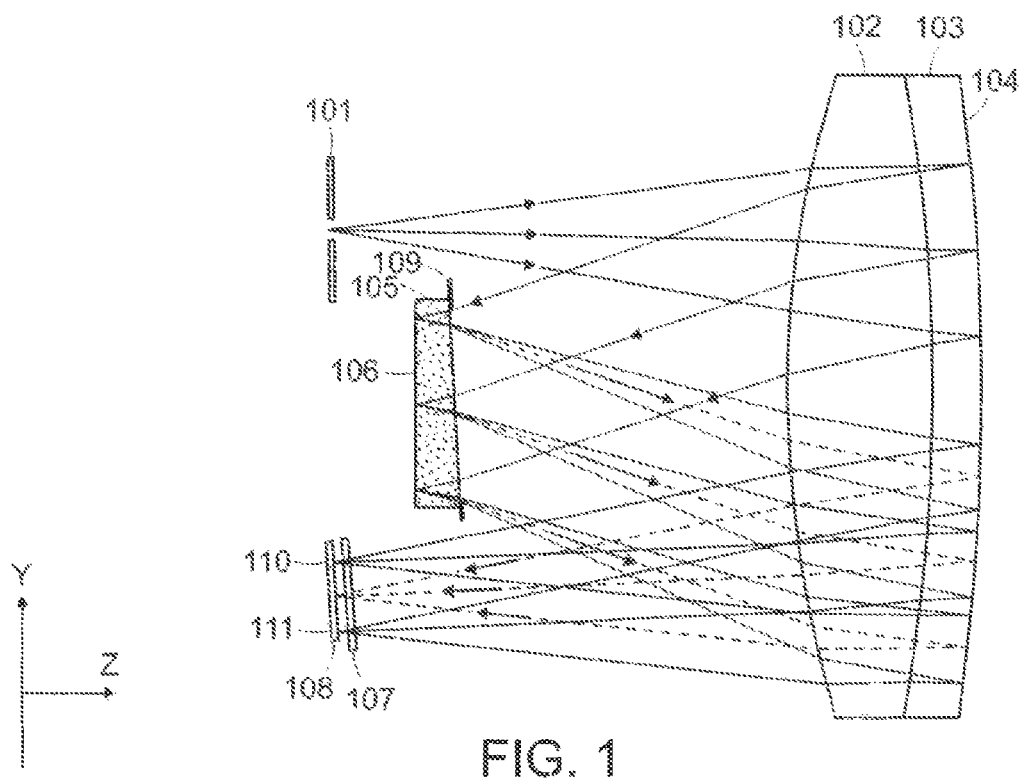
FIG. 1 is a schematic illustration of an embodiment of the visible-infrared plane grating imaging spectrometer constructed in accordance with the present invention, with the visible through infrared being dispersed and focused on the relevant parts of the detector with spatial resolution along the slit.
Figure 2:
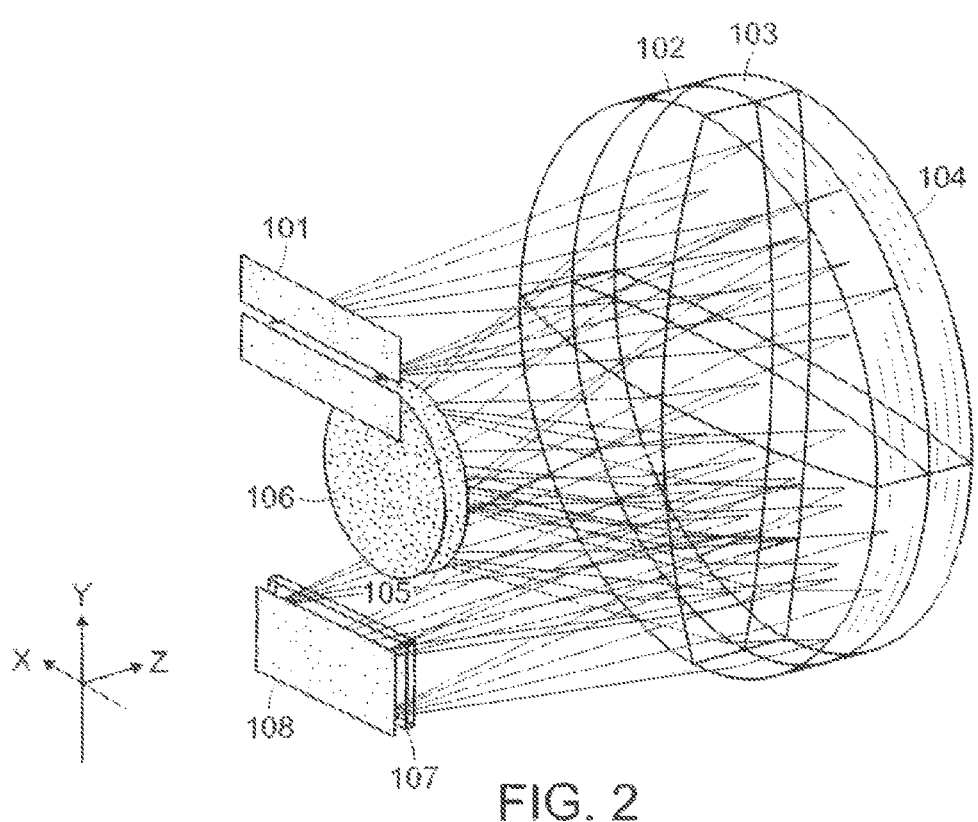
FIG. 2 is a perspective view of the embodiment of the visible infrared imaging spectrometer.

Referring now to FIG. 1 and FIG. 2, one particular embodiment is shown of a visible-infrared plane grating imaging spectrometer constructed in accordance with the present invention with the visible through infrared being dispersed and focused onto the detector. The grating rulings are parallel to the X axis resulting in the light spectrally dispersed along the Y axis, with the spatial information resolved for the different wavelengths along the X axis.

The light travels from the entrance slit 101 of the spectrometer to the first lens 102 of the cemented achromatic doublet, and onto the second lens 103, the reflective coating on the curved back 104 of the lens returns the light. The light then traverses back through the doublet lens 103 and 102, and travels on through the wedged refractive element 105 to be diffracted off the immersed reflective plane grating 106. The spectrally dispersed light now passes back through the wedged refractive element 105 and on through the lower portion of the doublet lens 102 and 103, the reflective coating on the curved back 104 of the lens returns the light, back thorough 103 and 102 which focus the light onto the detector array 108 after passing through the order sorting filter 107, with spectrum spread between the long wavelength end 110 and the short wavelength end 111. The order sorting stepped spectral handpass filter 107, enables rejection of unwanted spectral orders when the spectral region covers multiple octaves. For spectral regions less than an octave the order sorting filter 107 is not necessary.

The defining aperture stop 109 for the spectrometer a the entrance of the wedged optical element 105 helps reduce the stray light in the system.

The reflective diffraction grating 106 has the rulings immersed in optical contact with the wedged refractive optical element 105. The reflective diffraction grating can be formed by a conventional grating optically cemented to the wedged refractive optical element 105, or by replicating a grating in an adhesive layer on the surface of the wedged optical element 105 with a reflective coating applied. Alternately by suitable material choice the diffraction grating 106 could be etched or diamond cut into the surface of the wedged optical element 105, with a reflective coating applied. The design uses a conventional grating 106 with equally spaced straight grooves on a flat surface. The wedge angle of the optical element 105 is used to control distortion and the its refractive surface shape can compensate for aberrations, with power for reducing the Petzval curvature and aspheric terms for correcting the spherical and somatic aberrations.

Referring to FIG. 2 the overall size of the optical system is 65 mm in the Y dimension, 65 mm in the X dimension and 70 mm in the Z dimension. If the unused sides of the lens are removed, the size of the system is 65 mm in the Y dimension, 40 mm in the X dimension and 70 rum in the Z dimension.

In the design the optical powers of the achromatic lens element 102,103 and its curved reflective surface 104, together with any power on the wedged optical element 105 are adjusted to remove the Petzval curvature from the optical design, enabling the dispersed spectrum to be focused onto the flat visible-infrared detector 108. The opposite sign of the Petzval curvature from the concave reflecting surface balances the Petzval curvature of the positive lens and any residual curvature balanced by the power of the wedged optical element if necessary.

In the design the spectral smile and spatial keystone distortion are corrected by the wedge angle and surface shape of the wedged optical 105 element and the surface shapes and powers and geometry of the achromatic lens 102,103,104.

TABLE 1

Optical Design Parameters

| Parameter | Value |
| --- | --- |
| wavelength range | 0.4 to 2.5 microns |
| f-number at slit and detector | 3 |
| input pupil | approximately telecentric |
| detector format | 640 × 240 |
| pixel size | 30 microns |
| Performance over full detector area | |
| Optical performance | 80 percent encircled energy <30 microns |
| Spatial mapping distortion: change in spatial mapping with wavelength (keystone) | <0.1 pixel |
| Spectral distortion; spectral smile | <0.1 pixel |
| Ghost level | <0.1% of primary image |

Table 1 shows that this refractive design meets the challenging requirements over this wavelength range. The spatial keystone distortion has been kept to less than 0.1 pixel over the full wavelength range, enabling very good spectral correlation of the pixels at all wavelengths. This means that the spectrum from a single point in the entrance slit wanders from the center of a column of pixels by less than ±1.5 microns.

The spectral smile, which is the curvature of the slit image at each wavelength on the detector, has been kept to less than 0.1 pixel. Correcting the spectral slit curvature, and the spatial mapping distortion with wavelength, to less than one tenth of a pixel ensures that the images do not have to be resampled to correct for these distortions.

The image quality, given by the eighty percent encircled energy, is good over the full wavelength range, so the spectral line spread function is mainly determined by the entrance slit width and the pixel size. Since the spectrum covers multiple octaves, a cooled order sorting filter 107 in front of the detector prevents contamination from the unwanted spectral orders and reduces the infrared thermal background. The filter can either have different sections with the different spectral bandpasses or can be a linear variable filter.

Figure 3:
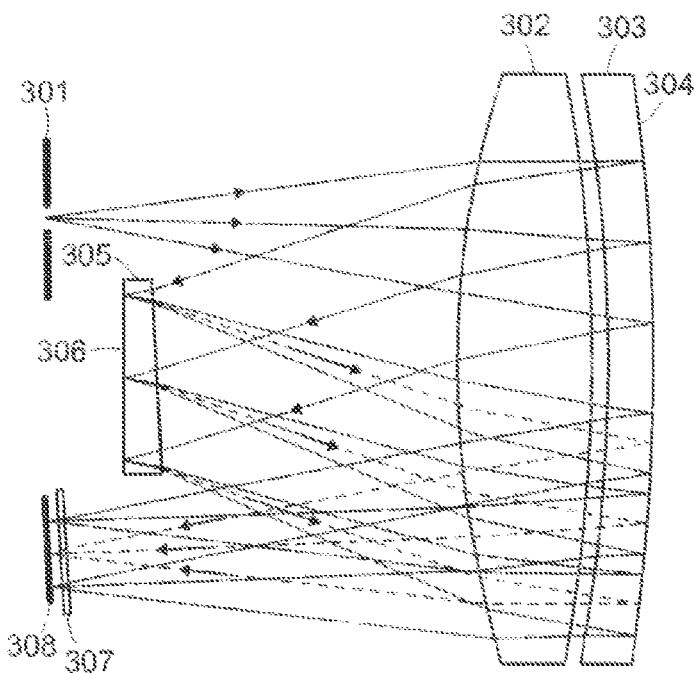
FIG. 3 is another embodiment of the visible-infrared plane grating imaging spectrometer constructed in accordance with the present invention illustrated in FIG. 1 that is a modification wherein the two lenses of the achromatic doublet are no longer cemented together but have been separated.

Referring now to FIG. 3, another embodiment of the visible-infrared plane grating imaging spectrometer constructed in accordance with the present invention illustrated in FIG. 1, that is a modification wherein the two lenses of the achromatic doublet are no longer cemented together but have been separated. The airspaced achromatic doublet consists of two separate lenses, a singlet lens 302, and a singlet lens 303 with a reflective coating 304 on its back surface. This lens has more degrees of freedom for aberration control having an additional optical surface, plus aspherics can now be used on the two inner surfaces. With the grating etched or cut into the wedged optical element, optical cement can be avoided altogether along with its limited spectral transmission. With suitable optical material choice this embodiment can be used in the mid-wave infrared, the long wave infrared or the ultraviolet.

The light travels from the entrance slit 301 of the spectrometer to the first lens 302 of the air spaced achromatic doublet, onto the second lens 303, the reflective coating on the curved back 304 of the lens returns the light. The light then traverses back through the two lenses 303 and 302, and travels on through the wedged refractive element 305 to be diffracted off the immersed reflective plane diffraction grating 306. The spectrally dispersed light now passes back through the wedged refractive element 305 and on through the lower portion of the two lenses 302 and 303, the reflective coating on the curved back 304 of the lens returns the light, passing back thorough 303 and 302 and focused onto the detector array 308, after passing through the order sorting filter 307.

Figure 4:
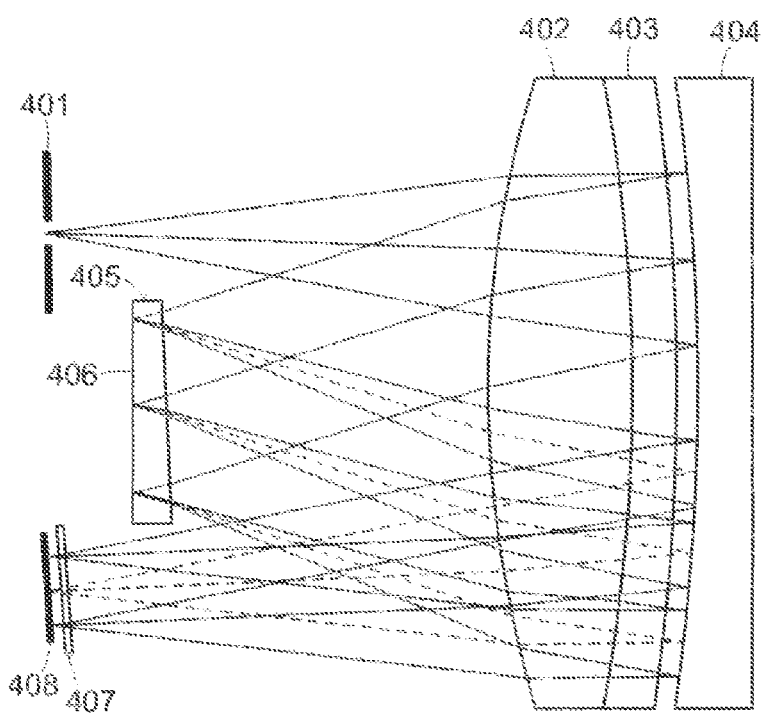
FIG. 4 is another embodiment of the visible-infrared plane grating imaging spectrometer constructed in accordance with the present invention illustrated in FIG. 1 that is a modification wherein the reflective coating has been removed from the back of the achromatic doublet and its function implemented by a separate concave mirror.

Referring now to FIG. 4, another embodiment of the visible-infrared plane grating imaging spectrometer constructed in accordance with the present invention illustrated in FIG. 1, that is a modification wherein the reflective coating has been removed from the back of the achromatic doublet and its function implemented by a separate concave mirror 404. This enables the separate adjustment of the power and aspheric surfaces for the mirror 404 and the hack of the lens 403.

The light travels from the entrance slit 401 of the spectrometer to the first lens 402 of the cemented achromatic doublet lens and passes through the second lens 403 to be reflected back from the concave mirror 404. The light then traverses back through the achromatic doublet lens 103 and 102, and then travels on through the wedged refractive element 405 to be diffracted off the immersed reflective plane grating 406. The spectrally dispersed light now passes back through the wedged refractive element 405 and on through the lower portion of the achromatic doublet lens 402 and 403, to be reflected off the concave mirror 404, traveling back thorough 403 and 402 which focus the light onto the detector array 408 after passing through the order sorting filter 407.

Figure 5:
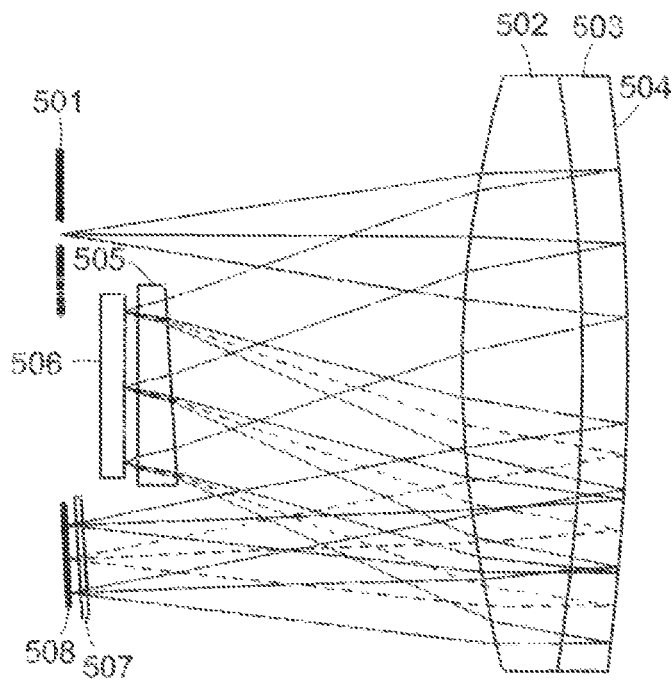
FIG. 5 is another embodiment of the visible-infrared plane grating imaging spectrometer constructed in accordance with the present invention illustrated in FIG. 1 that is a modification wherein the plane reflective diffraction grating immersed in the wedged optical element has been replaced by a separate wedged optical element and a separate plane reflective diffraction grating which is no longer immersed.

Referring now to FIG. 5, another embodiment of the visible-infrared plane grating imaging spectrometer constructed in accordance with the present invention illustrated in FIG. 1, that is a modification wherein the plane reflective diffraction grating immersed in the wedged optical element has been replaced by a separate wedged optical element 505 and a separate plane reflective diffraction grating 506 which is no longer immersed. This enables the shape of both sides of the separate wedge optical element 505 to be optimized for correcting the aberrations and reduces the complexity of immersing the grating.

The light travels from the entrance slit 501 of the spectrometer to the first lens 502 of the cemented achromatic doublet, onto the second lens 503, and the reflective coating on the curved back 504 of the lens returns the light. The light then traverses back through the doublet lens 503 and 502, and travels on through the separate wedged refractive element 505 to be diffracted off the reflective plane diffraction grating in air 506. The spectrally dispersed light now passes back through the separate wedged refractive element 505 and on through the lower portion of the doublet lens 502 and 503, and the reflective coating on the curved back 504 of the lens returns the light, back through 503 and 502, which focus the light onto the detector array 508 after passing through the order sorting filter 507.

Figure 6:
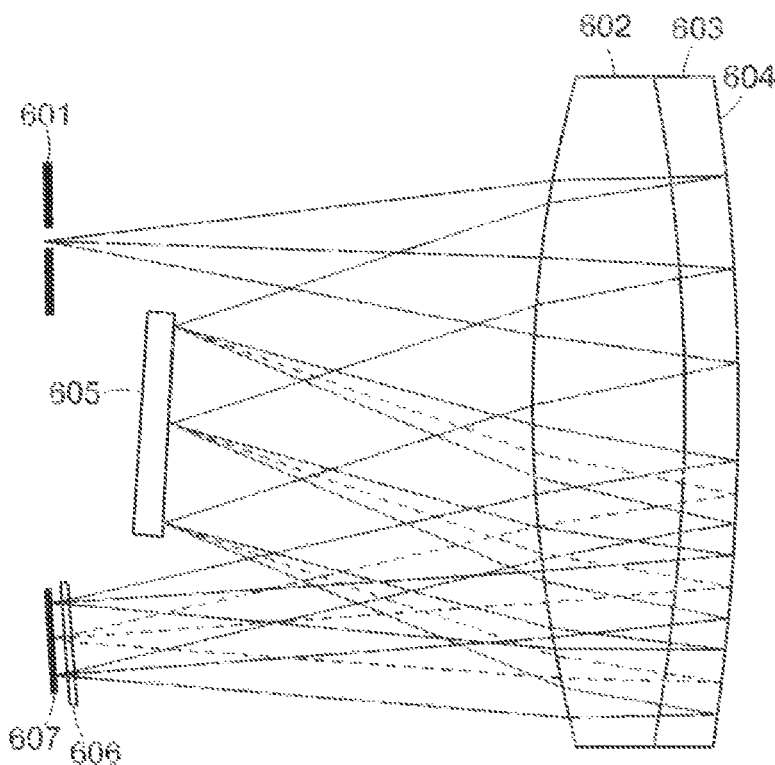
FIG. 6 is another embodiment of the visible-infrared plane grating imaging spectrometer constructed in accordance with the present invention illustrated in FIG. 1 that is a modification wherein the wedged optical element has been removed from the system so the plane reflective diffraction grating operates in air.

Referring now to FIG. 6, another embodiment of the visible-infrared plane grating imaging spectrometer constructed in accordance with the present invention illustrated in FIG. 1, that is a modification wherein the wedged optical element has been removed from the system so the plane reflective diffraction grating 605 operates in air. This is a simplification of the design for when the spatial and spectral distortion requirements can be relaxed.

The light travels from the entrance slit 601 of the spectrometer to the first lens 602 of the cemented achromatic doublet, onto the second lens 603, and the reflective coating on the curved back 604 of the lens then returns the light. The light then traverses back through the doublet lens 603 and 602, and travels on to be diffracted off the reflective plane diffraction grating in air 605. The reflected spectrally dispersed light now passes back through the lower portion of the doublet lens 602 and 603, and the reflective coating on the curved back 604 of the lens returns the light. The light then travels back thorough 603 and 602 which focus the light onto the detector array 607 after passing through the order sorting filter 606.

Figure 7:
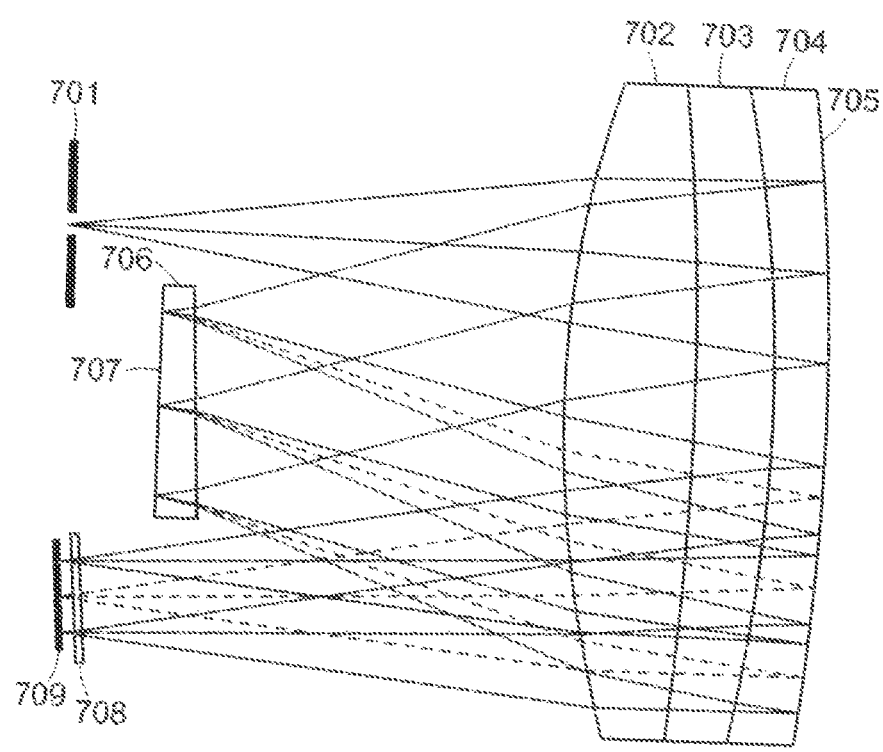
FIG. 7 is another embodiment of the visible-infrared plane grating imaging spectrometer constructed in accordance with the present invention illustrated in FIG. 1 that is a modification wherein the achromatic lens with a reflective back surface has been replaced by a triplet achromatic or apochromatic lens with reflective back surface.

Referring now to FIG. 7, another embodiment of the visible-infrared plane grating imaging spectrometer constructed in accordance with the present invention illustrated is FIG. 1, that is a modification wherein the achromatic lens with a reflective back surface has been replaced by a triplet achromatic or apochromatic lens with reflective back surface 702, 703, 704, 705. The triplet lens enables better secondary color correction, maintaining the performance for faster f-numbers or for wider spectral regions, or for more challenging regions such as the ultraviolet.

The light travels from the entrance slit 701 of the spectrometer to the first lens 702 of the cemented triple, on through the second lens 703 and third lens 704, with the reflective coating on the curved back 705 of the lens returning the light. The light then traverses back through the triplet lens 704, 703, 702, and then travels on through the wedged refractive element 706 to be diffracted off the immersed reflective plane grating 707. The spectrally dispersed light now passes back through the wedged refractive element 706 and on through the lower portion of the triplet lens 702, 703, 704, and the reflective coating on the curved back surface 705 of the lens returns the light, traveling back thorough 704, 703, 702 which focuses the light onto the detector array 709 after passing through the order sorting filter 708.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims. This invention can be adapted to different spectral regions by suitable choice of refractive and reflective materials, and with different detector arrays. This application covers all modifications, equivalents, and alternatives falling within the spirit and scope of the invention as defined by the following appended claims.

What is claimed is:

1. A visible-infrared plane grating imaging spectrometer, consisting of:
   an entrance slit for transmitting light,
   an achromatic doublet lens with a reflective back surface,
   a plane reflective diffraction grating immersed in a wedged optical element,
   an order sorting filter,
   a visible-infrared detector;
   said entrance slit, said achromatic doublet lens with the reflective back surface, said plane reflective diffraction grating immersed in a wedged optical element, said order sorting filter, and said detector for visible and infrared radiation positioned wherein,
   said entrance slit transmits light to said achromatic doublet lens with the reflective back surface, which refracts light and then reflects the light back from the surface, passing back through the lens and is directed to said plane reflective diffraction grating immersed in a wedged optical element, said wedged optical element refracts the light then the reflective diffraction grating spectrally disperses and directs the light back through the wedged optical element, which refracts light to said achromatic doublet lens with the reflective back surface, said achromatic doublet lens with the reflective back surface refracts light and then reflects the light from the back surface, passing back through the lens and focuses it to said order sorting filter, said order sorting filter transmits the selected spectral orders to said visible-infrared detector.

2. The visible-infrared plane grating imaging spectrometer of claim 1 wherein optical powers of said achromatic doublet lens and the power of its curved reflective surface, together with the power on the wedged optical element are adjusted to remove the Petzval curvature from the optical design and to ensure that the dispersed spectrum is focused onto a flat said visible-infrared detector.

3. The visible-infrared plane grating imaging spectrometer of claim 1 wherein wedge angle and surface shape of the wedged optical element in said plane reflective diffraction grating immersed in the wedged optical element and surface shapes and powers of the achromatic doublet lens and its curved reflective surface are adjusted to compensate for the spectral smile and keystone distortion.

4. The visible-infrared plane grating imaging spectrometer of claim 1 wherein spacing and curvature of grooves of the plane reflective diffraction grating immersed in the wedged optical element, is varied to correct spectrally varying aberrations and distortion, said plane reflective diffraction grating cemented to the wedged optical element, replicated or directly cut or etched into the wedged optical element.

5. The visible-infrared plane grating imaging spectrometer of claim 1 wherein the achromatic doublet lens has two lens elements not cemented, but separated into two separate lenses, with a second lens having the reflective back surface, wherein lens surface shapes between the two lenses are varied independently and are aspheric for aberration correction.

6. The visible-infrared plane grating imaging spectrometer of claim 1 wherein the reflective back surface is removed from the said achromatic doublet lens and is replaced by a separate concave mirror after the achromatic doublet lens, the light now passes through the achromatic doublet lens is refracted by the back surface to the concave reflective mirror, which reflects the light back through the lens, the shapes of the mirror surface and the back surface of the achromatic lens are adjusted for aberration correction.

7. The visible-infrared plane grating imaging spectrometer of claim 1 wherein said plane reflective diffraction grating immersed in the wedged optical element is split into two separate optical elements, a wedged refractive optical element and a plane reflective grating in air, light passes through the wedged refractive optical element, is spectrally dispersed through the plane reflective grating and directed back through the wedged refractive optical element.

8. The visible-infrared plane grating imaging spectrometer of claim 1 wherein said plane reflective diffraction grating immersed in the wedged optical element is replaced by a plane reflective diffraction grating in air, the powers of the refractive elements and the curved back surface of the achromatic doublet lens with reflective back surface are adjusted to reduce Petzval curvature.

9. The visible-infrared plane grating imaging spectrometer of claim 1 wherein said achromatic doublet lens with the reflective back surface element is replaced by an achromatic or apochromatic triplet lens with a reflective back surface, wherein optical powers of the triplet lens and its curved reflective back surface, together with any power on the wedged optical element are adjusted to remove Petzval curvature from optical design and to ensure that the displaced spectrum is focused onto a flat visible-infrared detector.

* * * * *